United States Patent Office 3,068,088
Patented Dec. 11, 1962

3,068,088
METHOD OF CONTROLLING VEGETATION
Arthur Schwerdle, Vineland, N.J., assignor to Vineland Chemical Company, Vineland, N.J., a firm
No Drawing. Filed July 11, 1960, Ser. No. 41,744
6 Claims. (Cl. 71—2.7)

This invention relates to herbicides, and more particularly, relates to a novel arsenic compound having outstanding selective herbicidal properties.

The present invention is an improvement in the field of herbicides to which my Patent No. 2,678,265 relates.

Crabgrass grows in intimate association with valuable turf grasses. Users of selective herbicides demand that the herbicide kill the crabgrass without injuring valuable grasses like turf grass. There is therefore a demand for a truly selective herbicide, which will kill crabgrass without inflicting any substantial injury on turf grasses.

It is an object of this invention to provide improved selective herbicides.

A particular object of this invention is to provide a novel alkylarsonate salt having selective herbicidal properties superior to herbicides available hitherto.

Another object is to provide a novel selective crabgrass killer.

These and other objects will become evident from a consideration of the following specification and claims.

I have now made the discovery that calcium bis(acid methylarsonate), which is a novel compound provided by this invention, has unexpectedly superior properties as a selective herbicide.

This novel compound has the formula

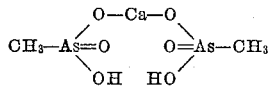

As will be seen from the stated formula, it is a bis, acid salt in which one atom of calcium replaces the hydrogen of a single acidic hydroxy group from each of two molecules of methylarsonic acid, leaving the second acidic hydroxy group of each methyl arsonic acid molecule free and in hydrogen-bonded, acid form.

My researches have now established that my new compound of the stated structure is an extraordinarily selective herbicide, which exhibits a marked discriminating selectivity of action. The calcium salt of this invention has an extremely potent phytotoxic effect on crabgrass plants, while it is free of any injurious effect on the turf grass even at inordinately high application rates, far above the practical use level.

Thus the unique particular structure of the presently provided novel compound is associated with an unusually specific herbicidal selectivity.

The advantageous qualities of my new calcium salt as a selective herbicide are manifold. It is fast-acting, so that the user can see within a few days after the first application that it is taking effect on the crabgrass, instead of having to wait until after repeated applications to see any visible injury to the crabgrass. It is highly potent, so that only relatively low quantities of the salt need to be applied to obtain a lethal effect on the crabgrass. It requires only one to two applications of the salt to attain kill of the crabgrass, even at low rates of application. Most importantly, as discussed above, it is extraordinarily discriminating and selective in its activity, and effects kill of crabgrass without inflicting injury on valuable grasses with which the crabgrass is associated.

To prepare the novel calcium salt of this invention, an acid will simply be reacted with a calcium compound in such a way as to result in formation of the bis(acid methylarsonate) salt. This may be accomplished in different ways.

One such procedure for the preparation of the calcium salt comprises the reaction of methanearsonic acid with an appropriate proportion of a calcium compound. Suitably the calcium compound used will be one in which the anion of the compound introduces no interfering ions into the reaction mixture. Thus for example, suitable calcium compounds for this use will comprise calcium hydroxide or calcium oxide, the anions of which are converted to water on reaction of the calcium compound with the acid. As will be appreciated, however, other calcium compounds, particularly soluble calcium compounds, may alternatively be used provided that suitable measures are taken to avoid interference with the reaction, such as neutralization of acid formed by reaction of the calcium compound with the methanearsonic acid. Since this complicates the procedure, use of a basic calcium compound like calcium hydroxide or oxide will generally be preferred in this method of synthesis, and these basic calcium compounds will be referred to hereinafter in discussing preparation by this method.

To effect preparation of the calcium bis(acid methylarsonate) by reaction of methanearsonic acid with a basic calcium compound, the acid will be reacted with the base in the ratio of at least two moles of the acid to one mole of the base. The reaction which occurs is illustrated by the following equation:

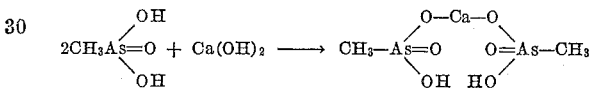

To carry out the reaction, the reactants need merely be contacted in the stated ratio in an inert reaction medium. This reaction medium will ordinarily and preferably be water. Desirably, but not necessarily, the calcium compound will be slurried in water before being contacted with the acid; where lime is being used as a reactant, this will convert it to the hydroxide of calcium. The temperatures, between room temperature and the boiling point of the solution, may be used but are less favorable since they tend to promote disproportionation of the calcium bis(acid methylarsonate) into neutral calcium methylarsonate and methylarsonic acid. The stated disproportionation is also a function of concentration, and to avoid its occurrence, advantageously the quantity of water used to provide the reaction medium will be such that the amount of calcium bis(acid methylarsonate) formed does not constitute more than 20% by weight of the final solution. If desired, higher solubilities of the acid calcium salt can be achieved by introducing hydrogen ions, as for example by adding an acid to the reaction medium. The stated acid must be one having an anion which does not form a highly insoluble calcium salt. The solution of the calcium bis(acid methylarsonate) can be separated from insoluble impurities contained, for example, in the calcium compound or the acid employed, by means of simple filtration. The filtrate containing the calcium bis(acid methylarsonate) may be used as such or evaporated to crystallize out the product. During heating to concentrate and evaporate the filtrate, the above-mentioned disproportionation may occur; but this is an equilibrium reaction, and by cooling and stirring the crystalline slurry before separating the crystals of product, contamination of the product with neutral calcium methylarsonate can be substantially avoided. By use of excess methylarsonic acid, as compared to the theoretical ratio required in accordance with the above-stated equation, very pure bis(acid methylarsonate) can be isolated by crystallization from the filtrate so obtained.

An alternative procedure for the preparation of calcium bis(acid methylarsonate) comprises the conversion of neutral calcium methylarsonate to the bis(acid methylarsonate) salt.

The neutral calcium metharsonate can be formed, for example, by reacting a selected methylarsonate salt with a calcium salt. As illustrated by the reaction of disodium methylarsonate with calcium chloride, for example, the neutral calcium methylarsonate is produced as shown by the following equation:

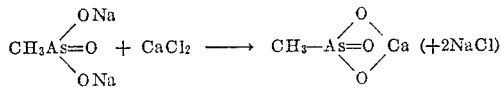

Most advantageously, the reaction of the methylarsonate salt and calcium compound will be effected in aqueous solution, and water soluble methylarsonate salts and calcium salts will be selected as reactants. The methylarsonate salts are generally water-soluble, and the salt used may comprise, for example, an ammonium salt, an alkali metal salt such as disodium or dipotassium methylarsonate, and so forth. Generally the common disodium methylarsonate will be preferred. Similarly any of a variety of soluble calcium compounds, such as a halide like chloride or bromide, or another water-soluble salt like the nitrate may be used; calcium chloride, being cheap and readily available, is preferred. Formation of the calcium methylarsonate consumes the reactants in a 1:1 molar ratio, as will be seen from the above equation, but it is not essential in this case that the reactants be contacted in this ratio, for the calcium methylarsonate is highly insoluble, and will precipitate from solution as it is formed. Accordingly, an excess of either of the reaction components may be used, so that the molar ratio of soluble methylarsonate salt to soluble calcium salt may vary, for example, from about 10:1 to about 1:10. The temperature is not critical, and may vary from just above the freezing point of the reaction mixture to the boiling point of the solution. Preferably the reaction is conducted at a temperature near 100° C. and with slow agitation, because these conditions tend to form a precipitate having the most desirable filtering characteristics. The precipitate of calcium methylarsonate can be isolated by filtration. It may be washed with water to free it from the soluble byproduct salt formed in its preparation before it is used to prepare the calcium bis(acid methylarsonate).

To prepare calcium bis(acid methylarsonate) from calcium methylarsonate, the calcium methylarsonate, prepared for example, as described above, will be treated with an acid. This reaction is believed to proceed as illustrated by the following equation, where sulfuric acid acid is shown as an example of the acid treating agent:

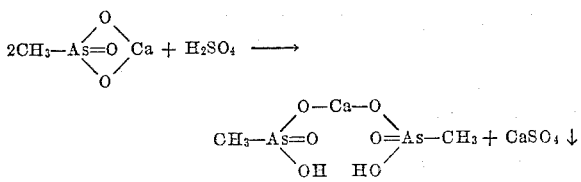

Any of a wide variety of organic and inorganic acids may be used to effect this conversion of the calcium neutral monosalt to the calcium bis acid salt. Thus for example, it may be an organic acid like citric or oxalic acid, or it may be an inorganic acid like sulfuric, sulfurous, hydrochloric, phosphoric or carbonic acid. Most preferably, the selected acid will be water-soluble and comprise an anion which combines with calcium to form a water-insoluble salt. It may even be methanearsonic acid, in which case the problem of elimination of unwanted byproduct calcium salt can be obviated when the amounts thereof are selected to provide one mole per mole of calcium methylarsonate. Generally, however, a stronger acid such as sulfuric acid is preferred. To facilitate handling, generally dilute sulfuric acid will be used, having a concentration substantially less than 66° Bé., such as, for example, a solution having a concentration of 40–50° Bé. Water provides a preferred reaction medium. Advantageously, the amount of water used will be minimized, so far as is consistent with convenient handling of the reactants, so as to effect maximum separation of the soluble calcium bis(acid methylarsonate) from the insoluble calcium salt byproduct of the acidification. If the sulfuric acid used is sufficiently dilute it may be possible to operate without the introduction of any extraneous water at all to the reaction mixture.

To effect conversion of the calcium methylarsonate to the bis(acid methylarsonate), the methylarsonate salt will be contacted in solution with an amount of acid calculated to provide approximately one hydrogen ion per molecule of calcium methylarsonate. Where the acid is dibasic as illustrated by sulfuric acid, this reaction will consume one-half mole of acid per mole of calcium methylarsonate. Where an acid like orthophosphoric acid is used, the molar ratio will be adjusted appropriately to provide the stated ratio of hydrogen ions to molecules of the neutral calcium salt. To determine the amount of acid required, the calcium methylarsonate used may be assayed, and the amount of acid needed calculated by theory, or the acid may simply be titrated into an aqueous suspension of the calcium methylarsonate until the pH of the mixture remains, after prolonged mixing, in the range of 4.8–5.2. Ordinarily, the temperature during the reaction will be room temperature or below, down to the freezing point of the mixture. As in the case of the above-described preparation of the acid salt from methylarsonate acid, higher temperatures, up to the solution boiling point, are operable but unfavorable as tending to promote disproportionation.

On completion of the reaction, the calcium bis(acid methylarsonate) can be isolated by separating it from the salt formed by the anion of the acid with calcium. Where the latter is an insoluble salt like calcium sulfate, filtration will serve to remove most of this byproduct of the reaction. Additional calcium bis(acid methylarsonate) can be recovered by washing the separated calcium sulfate and adding the washings to the filtrate. The aqueous solutions comprising the filtrate and washings will contain the calcium bis(acid methylarsonate) salt. They can be used as such, or evaporated to crystallize out the calcium bis(acid methylarsonate). If desired, the calcium acid may be purified before it is crystallized out. Thus, for example, sulfate ion can be removed from it adding a suitable soluble barium salt such as the chloride to the filtrate containing the acid methylarsonate salt. The resulting highly insoluble barium sulfate can then be removed readily by decantation or filtration.

Calcium bis(acil methylarsonate) crystallizes out from aqueous solution as the dihydrate, $$Ca(HCH_3AsO_3)_2 2H_2O$$

in the form of small, well-defined, colorless crystals. The density of the dihydrate is 2.28 at 20° C. The pH of a 10% by weight aqueous solution of the salt is 5.9. It is substantially insoluble (solubility less than 0.05 g. in 100 milliliters) in acetone, benzene, carbon tetrachloride dimethylformamide hexane, isopropanol and butanol at 20° C. In methanol and in diethyl ether, it decomposes within a few hours by disproportionation into calcium methylarsonate, which precipitates out, and methylarsonic acid. In thanol, the same disproportionation occurs, but less rapidly. On heating to a temperature approaching 190° C., the salt decomposes slowly according to the equation:

$$2Ca(HCH_3AsO_3)_2 \rightarrow 2CaCH_3AsO_3 + As_2O_3 + 2CH_3OH + H_2O$$

The presently provided novel salt is capable of use for many purposes, by virtue of its physical, chemical, and biological properties. Thus for example, it may be used as a chemical intermediate. Its most particular utility, however, in present contemplation, will reside in its application as an agricultural chemical, and especially, as a selective herbicide.

In using calcium bis(acid methylarsonate) as a herbicide in accordance with the present invention, to facilitate its distribution at the required rates of application, it will ordinarily be associated with a carrier. Thus for example, herbicidal compositions as provided by this invention may advantageously comprise solutions of the stated salt. The solubility of the presently provided calcium salt in water adapts it for application as an aqueous solution. As mentioned above, the salt may advantageously be prepared in water as a reaction medium, thus providing aqueous solutions thereof which may be recovered as such, rather than separating the salt by crystallization or like procedures. Generally, aqueous solutions so obtained will be more concentrated than is desired for herbicidal application, in which case they may be treated as concentrates, to be further diluted as desired befor application.

Solid carriers may alternatively be employed, whereby the herbicide is applied to the plants in finely-divided form, such as a dust or a granule. Illustrative of useful inert solid carriers are, for example, vermiculite, pyrophyllite, diatomaceous earth, volcanic ash, wood flour, and the like.

When solids such as vermiculite are used, it is essential that the chemical be carried on the surface of the carrier; application of the active material to the carrier as a solution, whereby it is soaked into the interior of the carrier, is unfavorable. When the chemical is on the carrier surface, then as the carrier particles strike the weed leaf, the arsonate adhering to the carrier surface is dislodged and brought into effective contact with the vegetation to be attacked.

Herbicidal compositions comprising the present novel salt may also include any of a variety of additional active ingredients, including for example herbicides such as arsenic compounds; fungicides such as copper compounds; fertilizers such as nitrogen and phosphorus compounds, and so forth. Where the present salt is being applied to a mixed stand of desired and undesired vegetation, such associated compounds will of course be selected from among compounds harmless to the desired vegetation. They may include compounds actually beneficial to the desired vegetation, like fertilizer, since the unusual selectivity of the present novel salt makes it possible to apply it broadcast, without harming valuable vegetation like turf grass. Active compounds associated with the present salt may also act as a carrier therefor.

Utilization of the presently provided novel salt to produce herbicidal effects will be effected by applying the salt, desirably associated with a carrier, to the undesired vegetation.

The vegetation treated may consist of a stand of partially or fully grown weeds, especially grassy weeds, growing alone or admixed with other growing plants. Most usually, the undesired vegetation will be intimately associated with other, valuable vegetative growth which it is desired to retain without injury thereto. This fact makes the unusual selectivity of herbicidal action of the arsonate salt provided by this invention particularly valuable. It can be applied broadcast to a stand of turf grass containing undesired crabgrass at high rates, which produce rapid injury and kill of the crabgrass, without injuring the permanent, desirable grasses.

The selective control of grassy weeds like crabgrass is of particular concern in turf grass culture in environments such as lawns, golf-greens and farms. The turf grass which is cultivated in such environments consists of perennial, generally sod-forming grasses, such as bluegrass, bentgrass, and so forth, which spread evenly to provide a solid permanent ground cover. Annual weeds like crabgrass crowd out the perennial grass during their growing season, and then die, leaving unsightly bare areas, devoid of ground cover. By virtue of its selective herbicidal action, the novel salt of this invention will kill off crabgrass during its growing season, permitting the perennial turf grass to spread over the ground areas from which the crabgrass has been eradicated.

The turf to be treated with the presently provided novel herbicide may be composed of Kentucky and Merion bluegrass, Zoysia and Bermuda grasses, as well as dichondra and clover. Even fescues, which are generally highly susceptible to damage by chemicals including previously available herbicidal alkylarsonates, is left substantialy uninjured by a concentration of calcium bis(acid methylarsonate) producing severe injury to crabgrass.

The rate of application of calcium bis(acid methylarsonate) to be employed to produce kill of the crabgrass plants may vary, depending on several factors. In particular, climate conditions will affect the proper dosage. A greater potency and rapidity of herbicidal action will generally be evident under hot, dry conditions and in tropical climates than where lower temperatures prevail. The preferred rate of application of the herbicide is therefore decreased as the temperature during the period of its use increases. Additionally, the carrier selected and the amount of carrier used in herbicidal compositions including calcium bis(acid methylarsonate) will affect the efficacy of the treatment. Thus for example, when the salt is applied as an aqueous solution, too little water does not allow fullest leaf wetting or distribution on the plants. If too much water is used, however, the herbicidal solution will run off the foliage and carry the chemical to the ground. Since the greatest effect is obtained by foliar absorption, run-off should be minimized.

Where the carrier for the salt is a liquid, the amount of solution applied may vary from about 50 to about 200 gals./acre. With the usual spray applicators, sufficient water will advantageously be provided to supply approximately 5 gallons per 1000 square feet as a carrying agent for the chemical. The optimal dilution in part depends on the spray equipment. However, the amount of solvent used will also affect the efficacy of the treatment. The more efficient and atomizing the spray unit is, the less water or other solvent can be used.

In most cases, the preferred method of effecting crabgrass kill will be to make two applications of the presently provided herbicide to the crabgrass plants. The rate to be used in this case may vary from about 1½ to about 5 pounds per acre, calculated on the calcium bis(acid methylarsonate) content as the anhydrous salt in the composition applied. Preferably, the selected rate will range from about 2 to about 4 pounds per acre, depending, as mentioned above, on ambient weather conditions and other factors influencing the effectiveness of the treatment. It is possible to kill crabgrass completely with calcium bis(acid methylarsonate) in one application without doing permanent injury to turf grass. In this case, higher rates will be employed, such as triple the rate employed in the two-application method. Sometimes more than two applications will be preferred, as for example where heavy or frequent rains have occurred, washing the herbicide from the treated vegetation before it has had an opportunity to take effect. In this case, about the same rates of application as in the two-application technique will generally be used, although if the herbicide remains on the plants from one treatment to the next, its rate of application may usually be reduced accordingly in correspondence with the number of treatments made. Where treatments are made at intervals, generally about a week will preferably be allowed to elapse between treatments, although intervals of from two or three days to a fortnight or more can also be effective.

While particular reference has been made in the preceding discussion to crabgrass as the weed to be treated with the presently provided novel herbicide, it is to be appreciated that it may also be used for control of other undesirable weeds. Thus for example, it may be used to eradicate other objectionable annual grasses prevalent in turf grass, which include foxtail (*Setaria viridis, lutescens, verticillata,* and *faberii*), barnyard grass (*Echinochloa crusgalli*), lemon grass, goose grass (*Eleusine indica*), sandbur (*Cenchrus pauciflorus*), witchgrass (*Panicum capillare*), knotweed (*Polygonum aviculare*), and common chickweed (*Stellaria media*). It also exhibits phytotoxic activity against certain other species of vegetation which are undesired and considered to be weeds in environments where turf grasses of the kind listed above are cultivated. Thus for example, the present salt can be used to advantage for the selective eradication of the perennial weedy grasses such as nutgrass (*Cyperus rotundus*), yellow nutgrass (*Cyperus esculentus*), and dallis grass (*Paspalum dilatatum* Poir), from stands of turf grasses like bluegrass, bentgrass, Bermuda grass, and so forth. Generally concentrations and rates of the same order as those mentioned above in discussing control of crabgrass will be found useful for the selective eradication of the stated grassy weeds and like undesired, vegetation. It is to be understood, moreover, that where desired, the present novel hebicide may be utilized under appropriate circumstances for complete elimination of vegetation within an area treated, as for example where the area is infested and overgrown with weeds, all of which are susceptible to its action.

The invention is illustrated but not limited by the following examples.

*Example I*

The area treated was a large, well-kept lawn having a dense turf of bentgrass containing some fescue. These grasses, particularly the fescue, are quite sensitive to chemical injury.

Crabgrass infestation of this lawn was medium to heavy at the borders, with light infestation elsewhere.

Calcium bis(acid methylarsonate) was applied to this lawn on a hot, sunny day in August in the late afternoon. The lawn was mowed and watered the day before the application. Part of the lawn was sprayed with the calcium salt at an application rate of 21.57 grams in 5 gallons of water per thousand square feet. A portion of the lawn was left untreated as a check.

During the next two weeks, the weather was mostly hot and fair. There were several light showers, but none of them occurred within two days following treatments of the lawn. Supplemental watering was used in normal maintenance.

In six days after the calcium salt was applied, the crabgrass in the treated portion of the lawn was severely and quite uniformly damaged. Almost all of it was at least yellowed and withered, and some was completely brown and dried up. The desirable turf grasses, by contrast, had suffered no detectable damage and had continued to grow at the same rate as the untreated portion of the lawn.

Treatment at the same rate and in the same manner as before was then repeated on the part of the lawn to which the calcium salt had been applied as stated above.

After four more days, the crabgrass was nearly all dead in the treated area, and its kill became complete shortly thereafter. No detectable injury whatever had been inflicted on the desirable turf grasses.

Observation of the lawn was continued for the remainder of the growing season, during which the lawn was given normal maintenance care. After mowing, bare spots appeared where the crabgrass had been eradicated, and the permanent grass gradually spread over these bare spots. At no time during the rest of the season was there any crabgrass in the treated areas.

*Example II*

The tests reported herein were conducted by spraying plots of Kentucky bluegrass with aqueous solutions of calcium bis(acid methylarsonate) at a rate of 5 gallons per thousand square feet. The treatments were applied during August, when temepratures during the period of the tests were substantially above 90° F. The rates of treatment were as follows:

Plot 1.—21.57 grams per thousand square feet.

Plot 2.—At 1.5 times the rate applied to plot 1.

After seven days, the plots were examined for bluegrass and crabgrass injury, and the findings recorded. A second application was then made to each of the plots, at respectively the same rates as before. After another seven days, the plots were again examined for bluegrass and crabgrass injury.

The results of these examinations are shown in the following table.

| Plot | Seven Day Results | | Fourteen Day Results | |
|---|---|---|---|---|
| | Bluegrass Injury | Crabgrass Injury | Bluegrass Injury | Crabgrass Injury |
| 1 | None | Severe [1] | None | Killed. |
| 2 | None | Severe | None | Killed. |

[1] Mostly brown and withered.

*Example III*

With procedures, test areas and weather conditions the same as those described in Example II, calcium bis(acid methylarsonate) was applied to a crabgrass-containing plot of Kentucky bluegrass at a rate of 43.14 grams per thousand square feet (twice the rate applied to plot 1 in Example II). Seven days after the treatment, the plot was examined for bluegrass and crabgrass injury. It was found that crabgrass injury was quite severe, but the bluegrass in the plot treated with the calcium salt was completely free of any detectable injury.

*Example IV*

These tests were carried out on a plot of Kentucky bluegrass containing crabgrass by spraying the plot with aqueous solutions of the arsenical at a rate of 5 gallons per thousand square feet, as in Example II. In this test period, the temperature on the date of application was 90° F., and daytime temperatures were seldom lower and often higher than this throughout the test period. Calcium bis(acid methylarsonate) was applied to a plot of the grass at a rate of 43.14 grams per thousand square feet.

After six days, the plot was observed. It was found that the bluegrass was totally uninjured, while the crabgrass was severely injured.

The plot was then treated with the calcium salt again, in the same manner as described above, immediately after the above-noted observations were made. After another six days, the plot was observed. The crabgrass was dead. The specific selectivity of the calcium salt was once more apparent. The condition of the bluegrass in the plot treated with the calcium salt was substantially the same as that in sections of the same area to which no herbicide had been applied.

*Example V*

In this test, calcium bis(acid methylarsonate) was applied to crabgrass at the rate of 21.57 grams per thousand square feet in October, when the temperature was 85° F. at the time of application, and ranged between 65° and 75° F. at night during the period of the test. Treatment of the plot with the herbicide was effected by spraying it with an aqueous solution of the arsenical at the rate of 5 gallons per thousand square feet.

After five days, the plot was examined. Rated on a scale of from 0 to 10, where 0 means no injury and 10 complete kill, the calcium salt was found to have produced severe crabgrass injury, rated at 8.

Example VI

This example illustrates the fact that calcium bis(acid methylarsonate) does not injure any of a variety of different turf grasses.

The calcium bis(acid methylarsonate) was applied at a rate of 21.57 grams in 5 gallons of water per thousand square feet to ten foot square plots of various turfs, consisting respectively of the following grasses:

Merion mix  Bent
Kentucky mix  Bermuda
Merion blue  Fescue
Kentucky blue

When the plots were examined five days later, the only turf which had suffered any apparent injury was the plot of fescue, which is especially sensitive to chemicals. Even the fescue, moreover, was only very slightly damaged, being rated at 2 on a scale of from 0 to 10 where 0=no injury and 10=complete kill.

Example VII

This example illustrates preparation of calcium bis(acid methylarsonate) by reaction of methylarsonate acid with calcium hydroxide.

A mixture of 3.1 grams of dry reagent grade calcium hydroxide with a solution prepared by dissolving 15.5 grams of pure methylarsonic acid in 35 milliliters of distilled water was stirred at room temperature until a faintly hazy solution was obtained. This was filtered, and the filtrate was allowed to evaporate spontaneously in an open glass dish until about four milliliters of free liquid were left. The crop of well-defined, colorless crystals which had formed was filtered off, washed quickly with five milliliters each of water and of isopropanol, successively, and dried in a vacuum desiccator. The crystalline product was very pure calcium bis(acid methylarsonate) dihydrate:

|  | Calculated, percent | Found, percent |
|---|---|---|
| Arsenic | 42.32 | 42.29 |
| Calcium | 11.32 | 11.28 |

Example VIII

This example illustrates the preparation of calcium bis(acid methylarsonate) from calcium methylarsonate.

A solution of 20 grams of a commercial grade of disodium methylarsonate, containing 85.01%

$$Na_2CH_3AsO_3 \cdot 6H_2O$$

in 50 milliliters of water was heated to 95° C. To this was added, slowly, a solution of 9 grams of crude calcium chloride (about 78% $CaCl_2$) in 20 milliliters of water, while the mixture was stirred and held at above 90° C. The product was a thin, chalk-like slurry of calcium methylarsonate having a pH of about 10.

The pH of this solution was reduced to about 8 by addition of a few drops of concentrated HCl, and it was then filtered, hot. The filter cake was washed with hot water until the washings were free of chloride ion. The filter cake (containing about 77% water) was now transferred to a beaker and work up into a smooth, heavy slurry by stirring in about 15 milliliters of water.

This slurry of calcium methylarsonate was now stirred while sulfuric acid was added to it, gradually, so that the temperature of the slurry rose only slightly. The acid used was concentrated (66° Bé.) sulfuric, diluted with an equal volume of water. Addition of the sulfuric acid was continued until the pH of the solution remained constant at 5 after stirring, which consumed about 6.5 grams. The resulting solution was filtered off from the precipitate of calcium sulfate which had formed. This precipitate was washed with water, and the washings added to the filtrate. The filtrate and washings were evaporated on a steam bath with constant stirring until a heavy slurry of very fine crystals was produced. The slurry was stirred while it was allowed to cool to room temperature, after which the crystals were filtered off, washed quickly with 5 milliliters of water and dried in a vacuum desiccator. The finely powdered product weighed 8.74 grams and assayed 87.91% $Ca(HCH_3AsO_3)_2 \cdot 2H_2O$ (with 12.13% calcium sulfate dihydrate).

While the invention has been described with particular reference to specific individual embodiments thereof, it is to be appreciated that modifications and variations may be made within the scope of the invention and the appended claims.

What is claimed is:

1. The method for the selective control of annual grasses in turf which comprises applying to turf containing annual grasses a composition comprising calcium bis(acid methylarsonate) in a concentration and amount sufficient to destroy said annual grasses but insufficient to destroy material quantities of the useful grasses and plants of said turf.

2. The method for the selective control of weeds in turf which comprises applying to turf containing weeds a composition comprising calcium bis(acid methylarsonate) in a concentration and amount sufficient to destroy said weeds but insufficient to destroy material quantities of the useful grasses and plants of said turf.

3. The method for the selective control of crabgrass in an area containing crabgrass plants in conjunction with desirable vegetation (which comprises applying to said area a composition comprising calcium bis(acid methylarsonate) in concentration and amount sufficient to destry crabgrass but insufficient to destroy material quantities of the useful grasses and plants.

4. The method for the selective control of crabgrass in an area containing crabgrass plants in turf which comprises applying to said area a composition comprising a carrier and calcium bis(acid methylarsonate) in a concentration and amount sufficient to destroy crabgrass but insufficient to destroy material quantities of the useful grasses and plants of said turf.

5. The method of claim 4 wherein said amount of calcium bis(acid methylarsonate) is between about 1½ and about 5 pounds per acre.

6. The method of claim 4 wherein said amount of calcium bis(acid methylarsonate) is between about 2 and about 4 pounds per acre.

References Cited in the file of this patent

UNITED STATES PATENTS

| 1,061,587 | Bart | May 13, 1913 |
| 2,606,200 | Matson et al. | Aug. 5, 1952 |
| 2,652,322 | Hedrick et al. | Sept. 15, 1953 |
| 2,678,265 | Schwerdle | May 11, 1954 |
| 2,863,893 | Kary et al. | Dec. 9, 1958 |